US012786859B2

(12) United States Patent
Fan

(10) Patent No.: US 12,786,859 B2
(45) Date of Patent: Nov. 3, 2026

(54) COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMMUNICATIONS CORP., LTD., Dongguan (CN)

( * ) Notice: Subject to any disclaimer, the term of this patent is extended or adjusted under 35 U.S.C. 154(b) by 281 days.

(21) Appl. No.: 18/612,706

(22) Filed: Mar. 21, 2024

(65) Prior Publication Data

US 2024/0236826 A1 Jul. 11, 2024

Related U.S. Application Data

(63) Continuation of application No. PCT/CN2021/120960, filed on Sep. 27, 2021.

(51) Int. Cl.
*H04W 16/22* (2009.01)
*H04W 28/08* (2023.01)
(Continued)

(52) U.S. Cl.
CPC ....... *H04W 48/16* (2013.01); *H04W 28/0925* (2020.05); *H04W 48/04* (2013.01); *H04W 60/04* (2013.01)

(58) Field of Classification Search
CPC .......... G06N 3/02; G06N 3/042; G06N 3/044; G06N 3/0442; G06N 3/045; G06N 3/0455; G06N 3/0464; G06N 3/0499; G06N 3/08; G06N 3/088; G06N 3/09; G06N 3/091; G06N 3/092; G06N 20/00; G06N 20/10; H04B 17/3912; H04B 17/3913;
(Continued)

(56) References Cited

U.S. PATENT DOCUMENTS

| | | | |
|---|---|---|---|
| 11,424,962 B2 | 8/2022 | Kumar et al. | |
| 12,038,976 B2 * | 7/2024 | Yuan | H04L 41/145 |

(Continued)

FOREIGN PATENT DOCUMENTS

| | | |
|---|---|---|
| CN | 111083722 A | 4/2020 |
| CN | 112423382 A | 2/2021 |

(Continued)

OTHER PUBLICATIONS

3GPP TR 22.874 V18.0.1, 3rd Generation Partnership Project; Technical Specification Group Services and System Aspects; Study on traffic characteristics and performance requirements for AI/ML model transfer in 5GS (Release 18), 111 pages, Jun. 2021.*

(Continued)

*Primary Examiner* — Frank Duong
(74) *Attorney, Agent, or Firm* — Ladas & Parry LLP

(57) ABSTRACT

A communication method and a terminal device are provided. The communication method includes: transmitting, by a terminal device, a first message to a network device; the first message is configured to request downloading at least one type of model data. The first message includes a model identifier corresponding to the at least one type of model data, and/or a service identifier corresponding to the at least one type of model data.

20 Claims, 3 Drawing Sheets

(51) Int. Cl.

| | |
|---|---|
| ***H04W 48/04*** | (2009.01) |
| ***H04W 48/16*** | (2009.01) |
| ***H04W 60/04*** | (2009.01) |

(58) Field of Classification Search

CPC ........... H04L 25/0254; H04L 25/03165; H04L 2012/5686; H04L 2025/03464; H04L 41/145; H04L 41/16; H04L 45/08; H04W 4/50; H04W 8/245; H04W 16/22; H04W 24/10; H04W 28/0925; H04W 48/00; H04W 48/04; H04W 48/16; H04W 60/04

See application file for complete search history.

(56) References Cited

U.S. PATENT DOCUMENTS

| | | | | |
|---|---|---|---|---|
| 2019/0311246 | A1 | 10/2019 | Yang et al. | |
| 2021/0174163 | A1 | 6/2021 | Verma et al. | |
| 2021/0304514 | A1* | 9/2021 | Croxford | G06N 7/01 |
| 2022/0108214 | A1* | 4/2022 | Lee | H04W 48/18 |
| 2022/0342713 | A1* | 10/2022 | Shen | G06F 9/5027 |
| 2022/0413926 | A1* | 12/2022 | Ishii | G06F 9/5027 |
| 2023/0232213 | A1 | 7/2023 | Hong | |
| 2024/0187959 | A1* | 6/2024 | Onno | H04W 40/02 |
| 2024/0205781 | A1* | 6/2024 | Li | H04W 36/32 |

FOREIGN PATENT DOCUMENTS

| | | | |
|---|---|---|---|
| EP | 3843356 A1 | | 6/2021 |
| WO | WO 2021/023388 | * | 2/2021 |
| WO | 2021134459 A1 | | 7/2021 |
| WO | 2021142609 A | | 7/2021 |
| WO | 2021163895 A1 | | 8/2021 |
| WO | 2022152055 A1 | | 7/2022 |

OTHER PUBLICATIONS

3GPP TS 38.331 V16.5.0 (Jun. 2021) ; 3rd Generation Partnership Project;Technical Specification Group Radio Access Network; NR;Radio Resource Control (RRC) protocol specification(Release 16)(956 pages).

International Search Report and Written Opinion, International Patent Application No. PCT/CN2021/120960, mailed Jun. 16, 2022 (14 pages).

Office Action issued by the European Patent Office for Application No. 21958022.2 mailed on Feb. 20, 2025.

* cited by examiner

COMMUNICATION METHOD AND TERMINAL DEVICE

CROSS REFERENCE TO RELATED APPLICATIONS

The present disclosure is a continuation of International Patent Application No. PCT/CN2021/120960, filed Sep. 27, 2021, the contents of which is herein incorporated by reference in its entirety.

TECHNICAL FIELD

The application relates to the field of communication technologies, in particular to a communication method and a terminal device.

BACKGROUND

With the development of technologies, optimization processing based on a model (such as an artificial intelligence (AI) model, an authentication model, and an encryption and decryption model) is a development trend of a communication system. In particular, the use of the AI model may solve a problem very well, which cannot be solved or cannot be solved well by human experience. However, as there are many nodes in the communication system, and there are different models required for different scenario optimizations, a management problem of large amount of model data occurs. Therefore, how to transmit model data between a terminal device and a network device is an urgent problem.

SUMMARY

At a first aspect, a communication method is provided and includes: transmitting, by a terminal device, a first message to a network device; the first message is configured to request downloading at least one type of model data. The first message includes at least one of a model identifier corresponding to the at least one type of model data and a service identifier corresponding to the at least one type of model data.

At a second aspect, a communication method is provided and includes: receiving, by a network device, a first message transmitted by a terminal device; the first message is configured to request downloading at least one type of model data. The first message includes at least one of a model identifier corresponding to the at least one type of model data and a service identifier corresponding to the at least one type of model data.

At a third aspect, a terminal is provided and includes a memory and a processor; the memory is configured to store a program, the processor is configured to call the program stored in the memory to perform the method at the first aspect.

DETAILED DESCRIPTION

Figure 1:
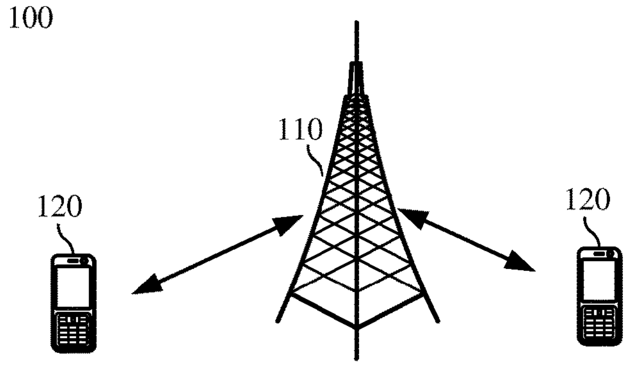
FIG. 1 is a schematic diagram of a wireless communication system 100 applied to embodiments of the present disclosure.

Technical solutions in embodiments of the present disclosure are described below in combination with the drawings. FIG. 1 is a schematic diagram of a wireless communication system 100 applied to embodiments of the present disclosure. The wireless communication system 100 may include a network device 110 and a terminal device 120. The network device 110 may be a device communicating with the terminal device 120. The network device 110 may provide a communication coverage for a particular geographical area, and may communicate with the terminal device 120 located in the coverage area.

FIG. 1 shows an example of a network device and two terminals. In some embodiments, the wireless communication system 100 may include multiple network devices, and the coverage of each network device may include other number of terminal devices, which is not limited.

In some embodiments, the wireless communication system 100 may also include a network controller, a mobile management entity, and other network entities, which is not limited.

It should be understood that the technical solutions of the embodiments of the present disclosure may be applied to various communication systems, such as a 5th generation (5G) system or a new radio (NR), a long term evolution (LTE) system, a LTE frequency division duplex (FDD) system, or a LTE time division duplex (TDD) system, etc. The technical solutions provided in the embodiments of the present disclosure may also be applied to a future communication system, such as a sixth generation mobile communication system, or a satellite communication system, etc.

The terminal device in the embodiments of the present disclosure may also be called a user equipment (UE), an access terminal, a user unit, a user station, a mobile terminal (MT), a remote station, a remote terminal, a mobile device, a user terminal, a terminal, a wireless communication device, a user agent, or a user apparatus, etc. The terminal device in the embodiments of the present disclosure may be a device that provides voice and/or data connectivity communication for the user, and may be configured to connect people, objects, and machines. For example, the terminal device may be a handheld device with wireless connection function, or an on-board device, etc. The terminal device in the embodiments of the present disclosure may be a mobile phone, a pad, a laptop, a palmtop computer, a mobile internet device (MID), a wearable device, a virtual reality (VR) device, an augmented reality (AR) device, or a wireless terminal in industrial control, self-driving, remote medical surgery, smart grid, transportation safety, a smart city, or a smart home, etc. In some embodiments, a UE may be served as a base station. For example, the UE may be served as a scheduling entity, which provides a sidelink signal between UEs in vehicle to everything (V2X) or device to device (D2D), etc. For example, a cellular phone and a car communicate with each other through a sidelink signal. A cellular phone communicates with a smart home device without relaying a communication signal through a base station.

The network device in the embodiments of the present disclosure may be a device configured to communicate with the terminal device, and the network device may be called an access network device or a wireless access network device, for example, the network device may be a base station. The network device in the embodiments of the present disclosure may be a radio access network (RAN) node (or device) that accesses the terminal device to a wireless network. A name of the base station may broadly cover or replace the following names, such as a Node B, a evolved NodeB (eNB), a next generation NodeB (gNB), a relay station, an access point, a transmitting and receiving point (TRP), a transmitting point (TP), a Master eNB (MeB), a secondary eNB (SeNB), a multi-standard radio (MSR) node, a home base station, a network controller, an access node, a wireless node, a access point (AP), a transmission node, a transceiver node, a base band unit (BBU), a remote radio unit (RRU), an active antenna unit (AAU), a remote radio head (RRH), a central unit (CU), a distributed unit (DU), or a positioning node, etc. The base station may be a macro base station, a micro base station, a relay node, a donor node or the like, or a combination thereof. The base station may be a communication module, a modem, or a chip configured in the aforementioned device or apparatus. The base station be a mobile switching center or a device performing function of a base station in D2D, V2X, or machine to machine (M2M) communication, a network side device in the 6G network, and a device performing the base station function in the future communication system. The base station may support networks with the same or different access technologies. The embodiments of the present disclosure do not limit a specific technology and specific device shape used by the network device.

The base station may be fixed or mobile. For example, a helicopter or an unmanned aerial vehicle may be configured as a mobile base station, and one or more cells may move based on a location of the mobile base station. In other examples, a helicopter or an unmanned aerial vehicle may be configured as a device communicating with another base station.

In some deployments, the network device in some embodiments of the present disclosure may be a CU or a DU, or the network device includes a CU and a DU. A gNB may include an AAU.

The network device may be a core network device. In this case, the communication between the core network device and the terminal device is replayed through an access network device. For example, the access network device includes a gNB, which is not limited.

The network device and the terminal device may be deployed on land, including indoor or outdoor. The network device and the terminal device may be handheld or vehicle-mounted, may be deployed on the water, may be deployed on an aircraft, a balloon and a satellite in the air, which is not limited.

It should be understood that all or part of functions of a communication device in the embodiments of the present disclosure may be implemented through a software function running on a hardware, or may be implemented through virtualization functions instantiated on a platform (such as a cloud platform).

With the development of technologies, more and more communication processes in a communication system are implemented through a model providing corresponding functions. For example, an AI model is configured to implement signal modulation and demodulation. For another example, an authentication model is configured to implement a related authentication process. For another example, an AI model is configured to implement encoding and decoding of a signal. For another example, an encryption and decryption model is configured to encrypt or decrypt data. The following introduces a neural network model in an AI model in combination with FIG. 2 to FIG. 3.

In recent years, AI researches represented by a neural network have made great achievements in many fields, and the AI researches will play an important role in people's production and life for a long time in the future. Common neural networks include a convolutional neural network (CNN), a recurrent neural network (RNN), and a deep neural network (DNN), etc.

The neural network applicable to the embodiments of the present disclosure is described below in combination with FIG. 2. The neural network shown in FIG. 2 may be divided into three categories according to locations of different layers, which are an input layer 210, a hidden layer 220, and an output layer 230. Generally speaking, the first layer is the input layer 210, the last layer is the output layer 230, and a middle layer between the first layer and the last layer is the hidden layer 220.

The input layer 210 is configured to input data. The input data may be, for example, a received signal received by a receiver. The hidden layer 220 is configured to process the input data. For example, the hidden layer 220 is configured to decompress a received signal. The output layer 220 is configured to output the output data which is processed. For example, the output layer 220 is configured to output a decompressed signal.

Figure 2:
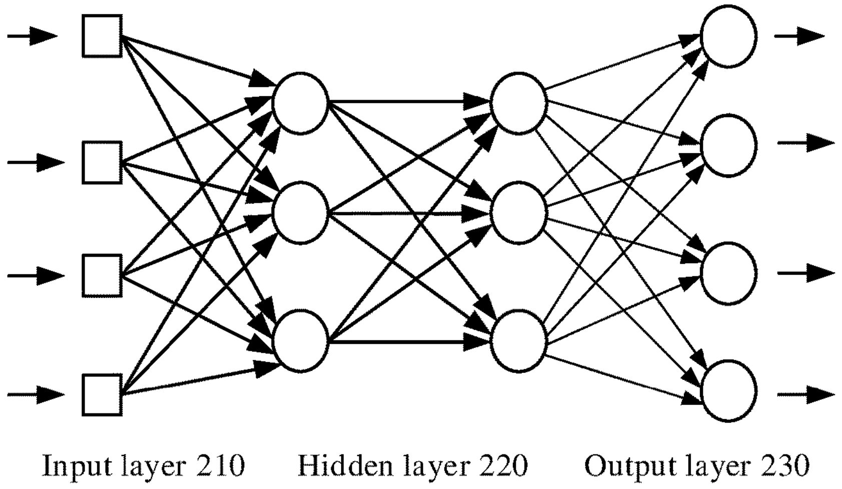
FIG. 2 is an architecture schematic diagram of a neural network applicable to embodiments of the present disclosure.

As shown in FIG. 2, the neural network includes multiple layers, and each layer includes multiple neurons. Neurons between layers may be fully connected, or some of the neurons between layers may be connected. For the connected neurons, the output of the neurons on an upper layer may be served as the input of the neurons on a lower layer.

With the continuous development of neural network researches, neural network deep learning algorithm has been proposed in recent years. More hidden layers are introduced into the neural network to form a DNN. More hidden layers enable DNN to process complex situations in the real world. In theory, the more parameters the model has, the more complex the model will be, and the larger "capacity" of the model will have, which means the model may complete more complex learning tasks. This neural network model is widely applied to pattern recognition, signal processing, optimizing combination, and anomaly detection, etc.

Figure 3:
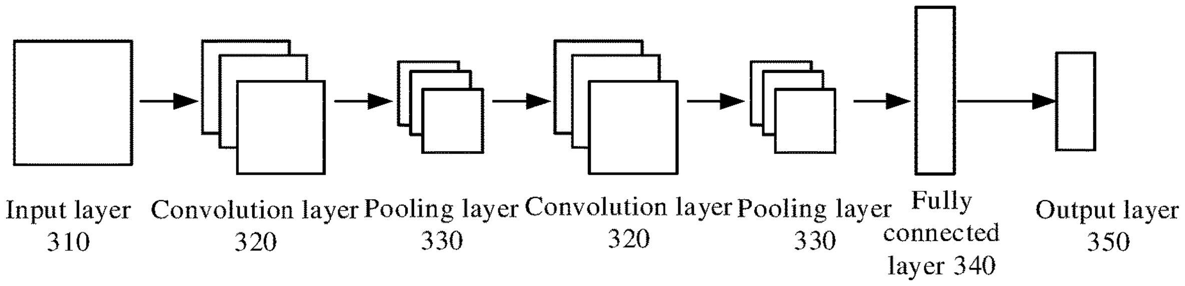
FIG. 3 is an architecture schematic diagram of a deep neural network of a convolution structure applicable to embodiments of the present disclosure.

The CNN is a deep neural network with a convolution structure. The structure is shown in FIG. 3, and may include an input layer 310, a convolution layer 320, a pooling layer 330, a fully connected layer 340, and an output layer 350.

Each convolution layer 320 may include many convolution operators. A convolution operator may be called a core, which may be seen as a filter configured to extract particular information from an input signal. The convolution operator may essentially be a weight matrix, which is usually predefined.

Weight values in these weight matrices are obtained through a lot of training in practical applications. Each weight matrix formed by the weight values obtained through training may extract information from the input signal, thereby helping the CNN to make a correct prediction.

When the CNN has multiple convolution layers, an initial convolution layer often extracts multiple general features, which may also be called low-level features. With the deepening of the CNN depth, the features extracted by the later convolution layer become more and more complex.

For the pooling layer 330, since the number of training parameters is often required to be reduced, it is often necessary to periodically introduce a pooling layer after the convolution layer. For example, one convolution layer may be followed by one pooling layer as shown in FIG. 3, or multiple convolution layers may be followed by one or more pooling layers. During signal processing, the only purpose of the pooling layer is to reduce a space size of extracted information.

For the fully connected layer 330, after the processing of the convolution layer 320 and the pooling layer 330, the CNN cannot output the required output information. As previously mentioned, the convolution layer 320 and the pooling layer 330 only extract features and reduce parameters brought by the input data. However, in order to generate the final output information (for example, a bit stream of original information transmitted by a transmission terminal), the CNN also needs to use the fully connected layer 340. Generally, the fully connected layer 340 may include multiple hidden layers, and parameters included in the multiple hidden layers may be obtained through pre-training according to relevant training data of a specific task type. For example, the task type may include decoding a data signal received by the receiver. For another example, the task type may include channel estimation based on a pilot signal received by the receiver.

A layer after the multiple hidden layers in the fully connected layer 330, that is, a last layer of the entire CNN is the output layer 350, which is configured to output a result. In general, the output layer 350 is set with a loss function (for example, a loss function similar to a classification cross entropy), and the loss function is configured to calculate a prediction error, that is, the loss function is configured to evaluate a difference between a result (also called a predicted value) output by the CNN model and an ideal result (also called a true value).

In order to minimize the loss function, the CNN model is required to be trained. In some implementations, a back-propagation algorithm (BP) may be configured to train the CNN model. A training process of BP includes a forward propagation process and a back propagation process. In the forward propagation process (as shown in FIG. 3, the propagation from 310 to 350 is the forward propagation), the input data is input into the above layers of the CNN model, is processed layer by layer, and is transmitted to the output layer. When the output result at the output layer is significantly different from the ideal result, minimizing the loss function is regarded as an optimization goal, the input data is performed the back propagation (as shown in FIG. 3, the propagation from 350 to 310 is the back propagation), a partial derivative of the optimization goal to a weight of each neuron layer by layer is worked out to form a gradient of the optimization goal to a weight vector as a basis for modifying the weight of the model, and the training process of the CNN is completed in the weight modification process. When the above error reaches an expected value, the training process of the CNN ends.

It should be noted that the CNN shown in FIG. 3 is only an example of a convolutional neural network. In specific applications, the convolutional neural network may be in a form of another network model, which is not limited.

As mentioned above, with the development of technologies, optimization processing based on a model (such as an artificial intelligence (AI) model, an authentication model, and an encryption and decryption model) is a development trend of a communication system. In particular, the use of the AI model may solve a problem very well, which cannot be solved or cannot be solved well by human experience. However, as there are many nodes in the communication system, and there are different models required for different scenario optimizations, a management problem of large amount of model data occurs. Therefore, how to transmit model data between a terminal device and a network device is an urgent problem.

The embodiments of the present disclosure provide a communication method, in which a terminal device transmits a first message to a network device to inform the network device one or more types of model data required to be downloaded, such that the model data between the terminal device and the network device is transmitted.

On one hand, when the terminal device transmits the first message to the network device, the terminal device informs the network device of the type of one or more types of model data required to be downloaded, which facilitates the network device to provide the model data for the terminal device as required, avoiding a problem that the network device cannot know model data expected by the terminal device and a large overhead caused by transmitting all model data to the terminal device.

On the other hand, when the terminal device transmits the first message to the network device, the terminal device informs the network device of the type of one or more types of model data to be downloaded, which facilitates to reduce a storage space in which the terminal device stores model data and avoids a problem that the network device cannot know the model data expected by the terminal device and there needs excessive memory occupation caused by large amount of model data pre-configured in the terminal device.

On another hand, when transmitting the first message to the network device, the terminal device informs the network device of the type of one or types of more model data to be downloaded, which facilitates to reduce the overhead for transmitting the first message, and avoids a situation when the terminal device needs to download multiple types of model data, the terminal device is required to transmit the first message to the network device for many times under a condition that one first message only requests one type of model data to be downloaded.

Figure 4:
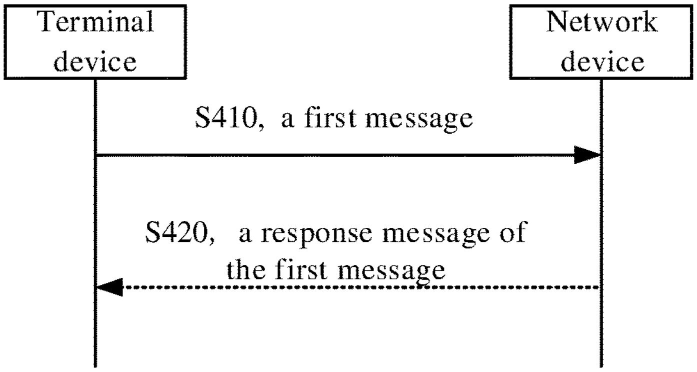
FIG. 4 is a schematic flowchart of a communication method according to some embodiments of the present disclosure.

A method of some embodiments of the present disclosure is described below in combination with FIG. 4. The method shown in FIG. 4 may be applied to the communication system shown in FIG. 1. The method shown in FIG. 4 includes an operation S410.

At operation S410, a terminal device transmits a first message to a network device.

The first message is configured to request downloading one or more types of model data.

The model data may include at least one of model data of an AI model, model data of an authentication model, and model data of an encryption and decryption model. When the model data is the model data of the AI model, the model data may include at least one of an input data requirement of the AI model, an output data requirement of the AI model, a training sample of the AI model, and a model parameter (for example, a weight of the AI model) of the AI model.

After receiving the first message, the network device may transmit a response message of the first message to the terminal device. The response message of the first message is configured for the network device to transmit a part or all of the at least one type of model data requested by the terminal device. Alternatively, the response message of the first message is configured for the network device to inform the terminal device whether a model data download request corresponding to the first message is successful. That is, the method may include operation S420 at which the network device transmits a response message of the first message to the terminal device.

It should be noted that, due to some reasons, the terminal device cannot download a part of the at least one type of model data. Therefore, the network device transmits the part of model data to the terminal device through the response message of the first message. Alternatively, the network device may inform the terminal device which model data is successfully requested through the response message of the first message. In other cases, the terminal device cannot download all of the at least one type of model data. Thus, the response message of the first message may be configured to indicate that the terminal device failed to download. In this case, the network device also may not transmit the response message of the first message to the terminal device.

The reasons may be caused by the terminal device. For example, the terminal device does not have a permission to download model data, or the terminal device is not located in a download area corresponding to the model data when downloading the model data, or a time when the terminal device downloads the model data is not a download time corresponding to the model data. The reasons may be caused by the network device. For example, the network device does not support a service of downloading model data, or the network device does not have corresponding model data, etc.

In some embodiments, as the first message carries at least one of a model identifier and a service identifier, the terminal device may inform the network device of the model data to be downloaded. The following describes the method in some embodiments of the present disclosure based on examples in which the first message carries different types of information.

In example 1, the first message may include a model identifier corresponding to at least one type of model data.

The model identifier corresponding to the at least one type of model data is configured to identify the model data. In some embodiments, the model data may include a number or a code of the model data itself.

It should be noted that the model identifier corresponding to the at least one of model data may be pre-configured by the network device for the terminal device, or may be predefined based on a protocol. For the manner of being pre-defined based on the protocol, a respective model identifier corresponding to each type of model data may be clearly given in the protocol. Correspondingly, with a pre-defined mapping relationship between model data and model identifiers, the terminal device determines the model identifier corresponding to the at least one type of model data to be downloaded according to its own service requirement, and makes the first message carry the model identifier corresponding to the at least one type of model data. For the manner of being pre-configured by the network device, the network device may configure the model identifier corresponding to the at least one type of model data for the terminal device through signaling. Correspondingly, the terminal device only needs to determine the model identifier corresponding to the at least one type of model data to be downloaded based on the signaling of the network device, and makes the first message carry the model identifier corresponding to the at least one type of model data. The manner of being pre-configured by the network device is more flexible than the manner of being pre-defined based on the protocol.

For a legal terminal device, the terminal device stores a large amount of configuration data, which may guide the terminal device to make a personalized legal service request. Since an application range of model data includes a non-access stratum (NAS) function and/or an access stratum (AS) function, an information source included in first message may be configuration data stored in the NAS and/or the AS of the terminal device. That is, in another embodiments, the terminal device may determine the model identifier corresponding to the at least one type of model data based on its own configuration information. That is, the method may include: the terminal device generating the first message according to first configuration information stored in a NAS and/or an AS. When the first message carries the model identifier corresponding to the at least one type of model data, the first configuration information includes a model identifier corresponding to at least one type of model data for the terminal device.

In some embodiments, the terminal device may determine a model identifier of at least one type of model data corresponding to a service based on an association relationship between services and model data.

The service may be an application layer service. For example, the service may be a voice service, a video service, a short message service, and a data service, etc. The service may be a communication process, such as a random access process, a switching process, a cell selection reselection process, a paging process, a channel quality feedback process, or a measurement process, etc.

The embodiments of the present disclosure do not limit a specific form of the association relationship between services and model data. The association relationship may be that one model identifier corresponds to a respective service identifier, or one model identifier corresponds to multiple service identifiers.

It should be noted that the association relationship between services and model data may be predefined based on a protocol, or may be pre-configured by the network device for the terminal device. Table 1 shows an implementation that a model identifier carried in signaling corresponds to model data. As shown in Table 1, a correspondence relationship between the model identifier and the service, which is configured by the network device for the terminal device through the signaling, is that: service 1 corresponds to model identifier 1, service 2 corresponds to model identifier 2, and service N corresponds to model identifier N, where N is a positive integer greater than or equal to 1.

TABLE 1

| Association Relationship Configuration Between Services and Model Identifiers | |
|---|---|
| Service 1 | Model identifier 1 |
| Service 2 | Model identifier 2 |
| . . . | . . . |
| Service N | Model identifier N |

As described in the example 1, in another embodiments, based on its own configuration information (for example, the first configuration information stored in the NAS and/or AS), the terminal device may maintain the service corresponding to the model identifier of the at least one type of model data for the terminal device. Thus, the terminal device may determine the model identifier corresponding to the at least one type of model data based on the first configuration information and the service corresponding to the at least one type of model data. That is, the method may include: the terminal device generating a first message according to the first configuration information stored in a NAS and/or an AS; when the first message carries a model identifier corresponding to at least one type of model data, the first configuration information includes a model identifier corresponding to the at least one type of model data for the terminal device.

In example 2, the first message may carry a service identifier corresponding to at least one type of model data.

The service identifier corresponding to the at least one type of model data may be understood as an identifier corresponding to a target service on which the model data acts.

The service corresponding to the model data may be an application layer service. For example, the service may be a voice service, a video service, a short message service, and a data service, etc. The service may be a communication process, such as a random access process, a switching process, a cell selection reselection process, a paging process, a channel quality feedback process, or a measurement process, etc.

The service identifier corresponding to the at least one type of model data may be understood that there is an association relationship between the model data and the service identifier, and the embodiments of the present disclosure does not limit a specific form of the association relationship. The association relationship may be that one type of model data corresponds to a respective service identifier, or one type of model data corresponds to multiple service identifiers.

In the above example, after the terminal device transmits the first message (i.e. initiates a model data download process), the terminal device may no longer maintain the association relationship between the service identifier and the model data. In some embodiments, the terminal device may determine a service identifier corresponding to model data based on information in a control data domain of the model data. For example, after determining the service identifier based on the first message, the network device may determine the at least one type of model data that the terminal device requests to download, based on the association relationship between service identifiers and model data, maintained by the network device, and may make a corresponding service identifier indicating the model data carried in the control data domain of the model data itself. In this way, after obtaining the at least one type of model data, the terminal device may know the corresponding relationship between the at least one type of model data and the service identifier based on the service identifier in the control data domain of the model data. In some embodiments of the present disclosure, when the terminal device only requests downloading one type of model data through the first message, the service identifier corresponding to the model data may be not carried in the control data domain of the model data.

It should be noted that the service identifier corresponding to the at least one type of model data may be predefined based on a protocol, or may be pre-configured by the network device for the terminal device.

As described in the example 2, in another embodiments, based on its own configuration information (for example, the first configuration information stored in the NAS and/or AS), the terminal device may maintain the service identifier corresponding to the at least one type of model data for the terminal device, so that the terminal device may determine the service identifier corresponding to the at least one type of model data base on the first configuration information. That is, the method may include: the terminal device generating the first message according to the first configuration information stored in the NAS and/or the AS; when the first message carries a service identifier corresponding to at least one type of model data, the first configuration information includes a service identifier corresponding to at least one type of model data for the terminal device.

In some embodiments, in order to ensure that the terminal device may download at least one type of model data, the network device may transmit download configuration information to the terminal device in advance, for example, a time domain resource, a frequency domain resource which are configured for the terminal device to receive at least one type of model data. That is, the method may include: the network device transmitting a download configuration to the terminal device. The download configuration is configured to configure the terminal device to download the at least one type of model data.

In order to facilitate the management of a whole download process of model data, the terminal device may establish a session management context and manage a download process of at least one type of model data through the session management context. Moreover, the established session management context may be only maintained at the terminal device side. In some embodiments of the present disclosure, the established session management context may be jointly maintained at the terminal device and the network device simultaneously.

The download process of the model data may be regarded as a network service, so that some operators do not support this service or provide this service for some users. Therefore, combining multiple situations (such as reasonable service billing, avoiding illegal downloading by illegal users, and data security, etc.), the terminal device may be configured to be registered before the terminal device downloads model data, so that the network device may determine whether the terminal device may perform a download process of the model data.

Figure 5:
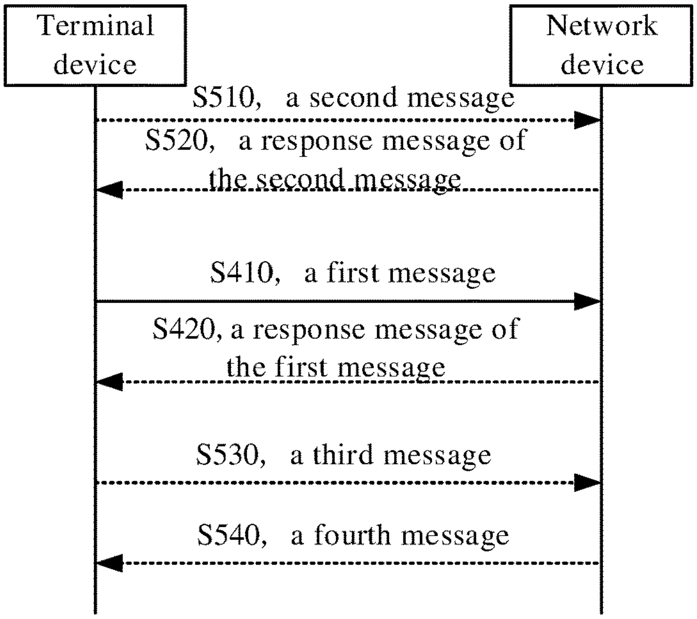
FIG. 5 is a schematic flowchart of a communication method according to some embodiments of the present disclosure.

That is, as shown in FIG. 5, before operation S410, the method may include operation S510 at which the terminal device transmits a second message to the network device. The second message is configured for the terminal device to register model data expected by the terminal device with the network device. It should be understood that the model data expected by the terminal device may include at least one type of model data that the terminal device requests to download in the foregoing. The model data expected by the terminal device may only include the at least one type of model data. In this way, it may be understood that the terminal device has successfully registered the at least one type of model with the network device through the second message, and the terminal device may download the at least one type of model from the network device through the first message. In some embodiments of the present disclosure, the model data expected by the terminal device may include other model data except for the at least one type of model data. In this case, it may be understood that, in the model data registered by the terminal device through the second message, other model data except for the at least one type of model data mentioned above is failed to be registered. Therefore, the terminal device requests downloading the at least one type of model data only through the first message. The embodiments of the present disclosure do not limit the model data expected by the terminal device.

In some embodiments, the second message may include a model identifier corresponding to the to-be-registered model data expected by the terminal device, and/or a service identifier corresponding to the to-be-registered model data expected by the terminal device. That is, the second message may indicate model data expected by the terminal device through the model identifier and/or the service identifier.

Correspondingly, when the model data expected by the terminal device may include the at least one type of model data, the terminal device transmits the first message to the network device only when the at least one type of model data is successfully registered.

Based on its own configuration information (for example, second configuration information stored in the NAS and/or AS), the terminal device may maintain the service corresponding to the model identifier of at least one type of model data for the terminal device. Thus, the terminal device may determine a model identifier and/or a service identifier of the model data expected by the terminal device and registered with the network device, based on the second configuration information. That is, the method may include: the terminal device generating a second message according to second configuration information stored in the NAS and/or the AS; when the second message indicates model data expected by the terminal device through a model identifier, the second configuration information includes the model identifier corresponding to at least one type of model data for the terminal device, and/or when the second message indicates the model data expected by the terminal device through a service identifier, the second configuration information includes the service identifier corresponding to at least one type of model data for the terminal device.

In some embodiments, the second message may include at least one of a model identifier corresponding to the at least one type of model data, a service identifier corresponding to the at least one type of model data, indication information configured to indicate the terminal device perform model data registering with the network device, first constraint information, and second constraint information.

The first constraint information is configured to indicate a download area expected by the terminal device when the terminal device downloads corresponding model data. Therefore, the first constraint information is also called "area constraint information". That is, there may be an association relationship between the at least one type of the model data and the download area expected by the terminal device.

In some embodiments, the association relationship may a relationship of one corresponding to one. For example, one type of model data may correspond to a respective download area expected by a terminal device. In another embodiments, one download area expected by a terminal device may correspond to multiple types of model data.

The first constraint information may indicate the download area and may include at least one of: a tracking area (TA) identifier corresponding to the download area expected by the terminal device, a radio access network area code (RANAC) identifier corresponding to the download area expected by the terminal device, a cell identifier corresponding to the download area expected by the terminal device, a geographic coordinate range corresponding to the download area expected by the terminal device.

The first constraint information is carried in the second message, so that the network device may judge whether to provide the terminal device for a service of downloading model data based on the download area expected by the terminal, or so that the network device may judge whether to accept the model data registration request of the terminal device.

The second constraint information is configured to constrain a download time expected by the terminal device when the terminal device downloads corresponding model data. Therefore, the second constraint information is also called "download time constraint information". That is, there may be an association relationship between the at least one type of the model data and the download time expected by the terminal device.

In some embodiments, the association relationship may a relationship of one corresponding to one. For example, one type of model data may correspond to a respective download time expected by a terminal device. In another embodiments, one download time expected by a terminal device may correspond to multiple types of model data.

The second constraint information is carried in the second message, so that the network device may judge whether to provide the terminal device for a service of downloading model data based on the download time expected by the terminal, or so that the network device may judge whether to accept the model data registration request of the terminal device.

The above indication information may be represented by an explicit signaling. For example, some bits in the second message may be occupied for indicating. In some embodiments of the present disclosure, the second message may implicitly indicate. In some embodiments, the indication information may be replaced by the second message itself. When the second message itself is dedicated for the model data expected by the terminal device and registered with the network device, the second message itself includes a meaning of the indication information. In this case, the indication information may implicitly indicate through the second message. In another embodiments, the indication information may be implicitly replaced by other information included in the second message. When other information included in the second message also has the same meaning as the indication information, the indication information may be implicitly replaced by the other information included in the second message. For example, model identifier information for which the terminal device performs model data registering with the network device may represents that the terminal device is initiating a model data registration request. Therefore, with model identifier information for which the terminal device performs model data registering with the network device, the indication information may implicitly indicate.

Correspondingly, after operation S510, the network device may transmit a registration result to the terminal device to indicate whether the model data expected by the terminal device is successfully registered. That is, as shown in FIG. 5, the method may include operation S520 at which the network device transmits a response message of the second message to the terminal device.

In some embodiments, the response message of the second message includes at least one of: a model identifier corresponding to at least one type of successfully-registered model data in the model data expected by the terminal device, download area restriction information corresponding to the at least one type of successfully-registered model data, download time restriction information corresponding to the at least one type of successfully-registered model data, a model identifier corresponding to at least one type of unsuccessfully-registered model data in the model data expected by the terminal device, registration area restriction information corresponding to at least one type of unsuccessfully-registered model data, registration time restriction information corresponding to the at least one type of unsuccessfully-registered model data, a failure reason corresponding to the at least one type of unsuccessfully-registered model data, and model data usage restriction information.

The download area restriction information corresponding to the at least one type of successfully-registered model data is configured to restrict an area at which the terminal device is located when the terminal device downloads model data.

That is, there may be an association relationship between the at least one type of model data and the area restricted by the download area restriction information. In some embodiments, the association relationship may a relationship of one corresponding to one. For example, one type of model data may correspond to a respective area restricted by download area restriction information. In another embodiments, one area restricted by download area restriction information may correspond to multiple types of model data.

In some embodiments, the area restricted by the download area restriction information may indicate through at least one of: a TA identifier corresponding to the area restricted by the download area restriction information, a RANAC identifier corresponding to the area restricted by the download area restriction information, a cell identifier corresponding to the area restricted by the download area restriction information; and a geographic coordinate range corresponding to the area restricted by the download area restriction information.

The download time restriction information corresponding to the at least one type of successfully-registered model data is configured to restrict a time when the terminal device downloads model data.

That is, there may be an association relationship between the at least one type of model data and the download time restricted by the download time restriction information. In some embodiments, the association relationship may a relationship of one corresponding to one. For example, one type of model data may correspond to a respective download time restricted by download time restriction information. In another embodiments, one download time restricted by download time restriction information may correspond to multiple types of model data.

The registration area restriction information corresponding to at least one type of unsuccessfully-registered model data is configured to restrict an area at which the terminal device is located when the terminal device registers corresponding model data.

That is, there may be an association relationship between at least one type of model data and the area restricted by the above registration area restriction information. In some embodiments, the association relationship may a relationship of one corresponding to one. For example, one type of model data may correspond to a respective area restricted by registration area restriction information. In another embodiments, one area restricted by registration area restriction information may correspond to multiple types of model data.

In some embodiments, the area restricted by the above registration area restriction information may indicate through at least one of: a TA identifier corresponding to the area restricted by the registration area restriction information, a RANAC identifier corresponding to the area restricted by the registration area restriction information, a cell identifier corresponding to the area restricted by the registration area restriction information; and a geographic coordinate range corresponding to the area restricted by the registration area restriction information.

The registration time restriction information corresponding to the at least one type of unsuccessfully-registered model data is configured to restrict a time when the terminal device registers corresponding model data.

That is, there may be an association relationship between at least one type of model data and the time restricted by the registration time restriction information. In some embodiments, the association relationship may a relationship of one corresponding to one. For example, one type of model data may correspond to a respective time restricted by registration time restriction information. In another embodiments, one time restricted by registration time restriction information may correspond to multiple types of model data.

The model data usage restriction information is configured to indicate whether at least two types of successfully-registered model data are capable of being used simultaneously.

In some cases, at least two types of model data cannot be used simultaneously due to mutual antagonism. Therefore, the model data usage restriction information may be configured to inform the terminal device, so as to guide the terminal device to make a correct download decision and a correct application decision subsequently, and avoid that model data with mutual antagonism is used simultaneously.

The failure reason corresponding to the at least one type of unsuccessfully-registered model data may be indicated by indication information of the failure reason, for example, the indication information may be a failure reason value. Different failure reason values may indicate different failure reasons. In some cases, the failure reason may include authentication failure, failure to find a registration server, and overload of registered users, etc., which is not limited.

With the change of a communication system or a communication environment, the model data maintained by the network device may no longer be applicable. Therefore, the model data in the communication system is required to be modified or deleted. Some embodiments of the present disclosure also provide a method for modifying or deleting model data.

In some embodiments, when the terminal device finds that the downloaded model data is no longer applicable, it may inform the network device to delete the model data. That is, as shown in FIG. 5, the method may also include operation S530. At operation S530, the terminal device transmits a third message to the network device. The third message is configured to request the network device to modify or delete model data that has been downloaded successfully. Correspondingly, after the network device receives the third message transmitted by the terminal device, the network device may delete or modify corresponding model data based on the third message when the network device accepts the third message transmitted by the terminal device.

It should be noted that, in some scenarios, after the terminal device finds that the downloaded model data is not applicable, it needs to download new model data from the network device again. Therefore, in this case, the third message and the first message may be transmitted through the same message. Alternatively, the third message and the first message may be independent messages, which is not limited.

In some embodiments, the method may include: the network device transmitting a response message of the third message to the terminal device after the network device receives the third message transmitted by the terminal device. The response message of the third message is configured to inform the terminal device of success or failure of the request included in the third message.

In another embodiments, the network device may actively initiate deletion or modification operation on model data. That is, as shown in FIG. 5, the method may include operation S540. At operation S540, the terminal device receives a fourth message transmitted by the network device. The fourth message is configured to indicate the terminal device to modify or delete model data that has been successfully downloaded. Correspondingly, after the terminal device receives the fourth message transmitted by the network device, the terminal device may delete or modify corresponding model data based on the fourth message when the terminal device accepts the fourth message transmitted by the network device.

In order to facilitate the management of the deletion or modification process of the entire model data, the terminal device may establish a session management context and manage the deletion or modification process of the at least one type of model data through the session management context. Moreover, the established session management context may only be maintained at the terminal device side. In some embodiments of the present disclosure, the established session management context may be jointly maintained at the terminal device and the network device simultaneously.

One or more messages of control commands such as download, registration, modification and deletion of model data may be processed by an access network device or a core network device. For a message processed by the core network device, a message transmission between the terminal device and the core network device is required to be relayed by the access network device. Since one access network device may be connected to multiple core network devices simultaneously, in order to route the control message to an appropriate core network device, it is necessary to define a routing method of a corresponding message. A network device may be connected to multiple core network nodes simultaneously, and different core network nodes support different functions. In order to route a model data processing message initiated by the terminal device to an appropriate core network node to be processed, the terminal device is required to add routing auxiliary information in a particular uplink message to assist the network device in routing delivery of the message. The model data processing message includes one or more of the first message, the second message, the third message, and the fourth message mentioned above.

In some embodiments, the particular uplink message may be an uplink dedicated message. That is, after the terminal device enters a connected state, the terminal device transmits the uplink dedicated message to the network device to assist the network device to perform routing operation of a core network device.

The uplink dedicated message includes the model identifier corresponding to the at least one type of model data, and/or includes the service identifier corresponding to the at least one type of model data.

The uplink dedicated message may be the first uplink dedicated message, which is transmitted to the network device after the terminal device enters the connected state, for example, message 5.

Some method embodiments of the present disclosure mentioned above are described in detail in combination with FIGS. 1 to 5, and some apparatus embodiments of the present disclosure are described in detail below in combination with FIGS. 6 to 8. It should be understood that the description of the method embodiments corresponds to the description of the apparatus embodiments. Therefore, a part not described in detail may refer to the previous method embodiments.

Figure 6:
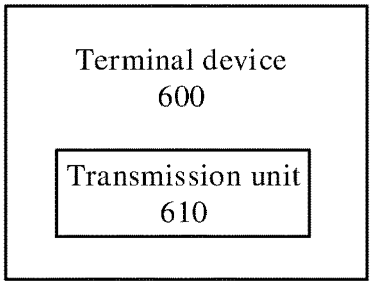
FIG. 6 is a schematic diagram of a terminal device according to some embodiments of the present disclosure.

FIG. 6 is a schematic diagram of a terminal device according to some embodiments of the present disclosure. A terminal device 600 shown in FIG. 6 includes a transmission unit 610.

The transmission unit 610 is configured to transmit a first message to a network device; the first message is configured to request downloading at least one type of model data.

In some embodiments, the first message includes a model identifier corresponding to the at least one type of model data, and/or a service identifier corresponding to the at least one type of model data.

In some embodiments, the terminal device includes a first processing unit configured to establish a session management context; the session management context is configured to manage a download process, a modification process, or a deletion process of the at least one type of model data.

In some embodiments, the terminal device includes a first receiving unit configured to receive a download configuration transmitted by the network device; the download configuration is configured to configure the terminal device to download the at least one type of model data.

In some embodiments, the terminal device includes a second processing unit configured to generate the first message according to first configuration information stored in a non-access stratum (NAS) and/or an assess stratum (AS); the first configuration information includes a model identifier corresponding to at least one type of model data for the terminal device, in response to the first message carrying the model identifier corresponding to the at least one type of model data; and/or the first configuration information includes a service identifier corresponding to the at least one type of model data for the terminal device, in response to the first message carrying the service identifier corresponding to the at least one type of model data.

In some embodiments, the transmission unit is configured to transmit a second message to the network device; the second message is configured to register model data expected by the terminal device with the network device.

In some embodiments, the model data expected by the terminal device includes the at least one type of model data; the transmission unit is further configured to transmit the first message to the network device, in response to the at least one type of model data being successfully registered.

In some embodiments, the second message includes at least one of: a model identifier corresponding to the at least one type of model data; a service identifier corresponding to the at least one type of model data; indication information, configured to indicate the terminal device perform model data registering with the network device; first constraint information, configured to indicate a download area expected by the terminal device when the terminal device downloads corresponding model data; and second constraint information, configured to constrain a download time expected by the terminal device when the terminal device downloads the corresponding model data.

In some embodiments, the first constraint information includes at least one of: a tracking area (TA) identifier corresponding to the download area expected by the terminal device; a radio access network area code (RANAC) identifier corresponding to the download area expected by the terminal device; a cell identifier corresponding to the download area expected by the terminal device; and a geographic coordinate range corresponding to the download area expected by the terminal device.

In some embodiments, the terminal device further includes a second receiving unit configured to receive a response message of the second message transmitted by the network device; the response message is configured to indicate whether the model data expected by the terminal device is successfully registered.

In some embodiments, the response message includes at least one of: a model identifier corresponding to at least one type of successfully-registered model data in the model data expected by the terminal device; download area restriction information corresponding to the at least one type of successfully-registered model data; the download area restriction information is configured to restrict an area at which the terminal device is located when the terminal device downloads model data; download time restriction information corresponding to the at least one type of successfully-registered model data; the download time restriction information is configured to restrict a time when the terminal device downloads model data; a model identifier corresponding to at least one type of unsuccessfully-registered model data in the model data expected by the terminal device; registration area restriction information corresponding to the at least one type of unsuccessfully-registered model data; the registration area restriction information is configured to restrict an area at which the terminal device is located when the terminal device registers corresponding model data; registration time restriction information corresponding to the at least one type of unsuccessfully-registered model data; the registration time area restriction information is configured to restrict a time when the terminal device registers corresponding model data; a failure reason corresponding to the at least one type of unsuccessfully-registered model data; and model data usage restriction information configured to indicate whether at least two types of successfully-registered model data are capable of being used simultaneously.

In some embodiments, the second message includes a model identifier corresponding to to-be-registered model data expected by the terminal device, and/or a service identifier corresponding to the to-be-registered model data expected by the terminal device.

In some embodiments, the terminal device further includes a third processing unit configured to generate the second message according to second configuration information stored in a non-assess stratum (NAS) and/or an assess stratum (AS); the second configuration information includes a model identifier corresponding to at least one type of model data for the terminal device, and/or the second configuration information includes a service identifier corresponding to the at least one type of model data for the terminal device.

In some embodiments, the transmission unit is further configured to transmit an uplink dedicated message to the network device after the terminal device enters a connected state; the uplink dedicated message includes a model identifier corresponding to the at least one type of model data, and/or a service identifier corresponding to the at least one type of model data.

In some embodiments, the transmission unit is further configured to transmit a third message to the network device; the third message is configured to request the network device to modify or delete model data that has been successfully downloaded.

In some embodiments, the terminal device further includes a third receiving unit configured to receive a fourth message transmitted by the network device; the fourth message is configured to indicate that the terminal device modifies or deletes model data that has been successfully downloaded.

Figure 7:
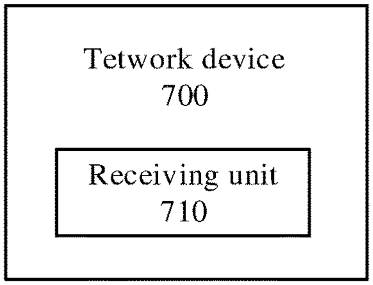
FIG. 7 is a schematic diagram of a network device according to some embodiments of the present disclosure.

FIG. 7 is a schematic diagram of a network device according to some embodiments of the present disclosure. A network device 700 shown in FIG. 7 includes a receiving unit 710.

The receiving unit 710 is configured to receive a first message transmitted by a terminal device; the first message is configured to request downloading at least one type of model data.

In some embodiments, the first message includes a model identifier corresponding to the at least one type of model data, and/or a service identifier corresponding to the at least one type of model data.

In some embodiments, the network device further includes a processing unit configured to maintain a session management context; the session management context is configured to manage a download process, a modification process, or a deletion process of the at least one type of model data.

In some embodiments, the network device further includes a first transmission unit configured to transmit a download configuration to the terminal device; the download configuration is configured to configure the terminal device to download the at least one type of model data.

In some embodiments, the receiving unit is configured to receive a second message transmitted by the terminal device; the second message is configured to register model data expected by the terminal device with the network device.

In some embodiments, the model data expected by the terminal device includes the at least one type of model data; the receiving unit is further configured to receive the first message transmitted by the terminal device, in response to the at least one type of model data being successfully registered.

In some embodiments, the second message includes at least one of: a model identifier corresponding to the at least one type of model data; a service identifier corresponding to the at least one type of model data; indication information configured to indicate the terminal device perform model data registering with the network device; first constraint information configured to indicate a download area expected by the terminal device when the terminal device downloads corresponding model data; and second constraint information configured to constrain a download time expected by the terminal device when the terminal device downloads the corresponding model data.

In some embodiments, the first constraint information includes at least one of: a tracking area (TA) identifier corresponding to the download area expected by the terminal device; a radio access network area code (RANAC) identifier corresponding to the download area expected by the terminal device; a cell identifier corresponding to the download area expected by the terminal device; and a geographic coordinate range corresponding to the download area expected by the terminal device.

In some embodiments, the second transmission unit is further configured to transmit a response message of the second message to the terminal device; the response message is configured to indicate whether the model data expected by the terminal device is successfully registered.

In some embodiments, the response message includes at least one of: a model identifier corresponding to at least one type of successfully-registered model data in the model data expected by the terminal device; download area restriction information corresponding to the at least one type of successfully-registered model data; the download area restriction information is configured to restrict an area at which the terminal device is located when the terminal device downloads model data; download time restriction information corresponding to the at least one type of successfully-registered model data; the download time restriction information is configured to restrict a time when the terminal device downloads model data; a model identifier corresponding to at least one type of unsuccessfully-registered model data in the model data expected by the terminal device; registration area restriction information corresponding to the at least one type of unsuccessfully-registered model data; the registration area restriction information is configured to restrict an area at which the terminal device is located when the terminal device registers corresponding model data; registration time restriction information corresponding to the at least one type of unsuccessfully-registered model data; the registration time area restriction information is configured to restrict a time when the terminal device registers corresponding model data; a failure reason corresponding to the at least one type of unsuccessfully-registered model data; and model data usage restriction information, configured to indicate whether at least two types of successfully-registered model data are capable of being used simultaneously.

In some embodiments, the second message includes a model identifier corresponding to to-be-registered model data expected by the terminal device, and/or a service identifier corresponding to the to-be-registered model data expected by the terminal device.

In some embodiments, the receiving unit is configured to receive an uplink dedicated message transmitted by the terminal device after the terminal device enters a connected state; the uplink dedicated message includes a model identifier corresponding to the at least one type of model data, and/or a service identifier corresponding to the at least one type of model data.

In some embodiments, the receiving unit is further configured to receive a third message transmitted by the terminal device; the third message is configured to request the network device to modify or delete model data that has been successfully downloaded.

In some embodiments, the network device further includes a second transmission unit configured to transmit a fourth message to the terminal device; the fourth message is configured to indicate that the terminal device modifies or deletes model data that has been successfully downloaded.

Figure 8:
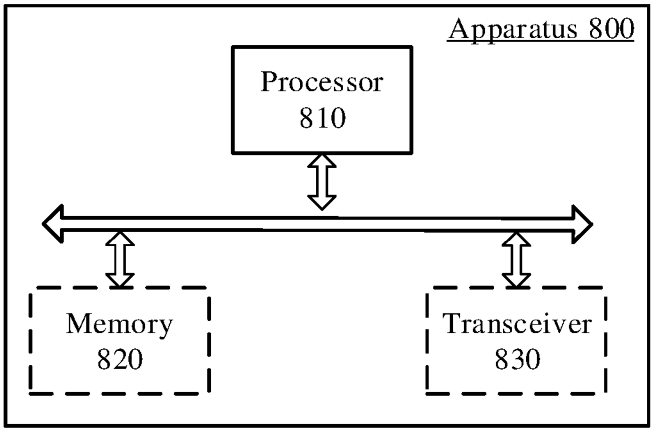
FIG. 8 is a structural schematic diagram of a communication apparatus according to some embodiments of the present disclosure.

FIG. 8 is a structural schematic diagram of a communication apparatus according to some embodiments of the present disclosure. Broken lines shown in FIG. 8 represents an optical unit or module. An apparatus 800 may be configured to implement the method in the method embodiments mentioned above. The apparatus 800 may be a chip, a terminal device, or a network device.

The apparatus 800 may include one or more processors 810. The processor 810 may support the device 800 to implement the method described in the above method embodiments. The processor 810 may be a general purpose processor or a special purpose processor. For example, the processor may be a central processing unit (CPU). Alternatively, the processor may be other general purpose processor, a digital signal processor (DSP), an application specific integrated circuit (ASIC), a field programmable gate array (FPGA), or other programmable logic component, a discrete gate or transistor logic component, or a discrete hardware component, etc. The general processor may be a microprocessor or any conventional processor, etc.

The apparatus 800 may include one or more memories 820. The memory 820 stores a program that may be executed by the processor 810 to enable the processor 810 to perform the method described in the above method embodiments. The memory 820 may be independent of the processor 810 or may be integrated in the processor 810.

The apparatus 800 may also include a transceiver 830. The processor 810 may communicate with other devices or chips through the transceiver 830. For example, the processor 810 may transmit and receive data with other devices or chips through the transceiver 830.

Some embodiments of the present disclosure provide a computer-readable storage medium configured to store a program. The computer-readable storage medium may be applied to the terminal device or network device provided in the embodiments of the present disclosure, and the program enables a computer to execute the methods performed by the terminal device or network device in the embodiments of the present disclosure.

Some embodiments of the present disclosure provide a computer program product. The computer program product includes a program. The computer program product may be applied to the terminal device or network device provided in the embodiments of the present disclosure, and the program enables a computer to execute the methods performed by the terminal device or network device in the embodiments of the present disclosure.

Some embodiments of the present disclosure provide a computer program. The computer program may be applied to the terminal device or network device provided in the embodiments of the present disclosure, and the computer program enables a computer to execute the methods performed by the terminal device or network device in the embodiments of the present disclosure.

It should be understood that the terms "system" and "network" in the present disclosure may be used interchangeably. In addition, the terms used in the present disclosure are only used to explain the embodiments of the present disclosure, and are not intended to limit the present disclosure. The terms "first", "second", "third", and "fourth" in the description, claims and the drawings of the present disclosure are used to distinguish different objects, rather than to describe an order. Moreover, the terms "including" and "having", and any modification thereof are intended to cover un-exclusive inclusion.

It should be understood that the "indication" mentioned in some embodiments of the present disclosure may be a direct indication, an indirect indication, or an association. For example, A indicating B may mean that A indicates B directly, for example, B may be obtained through A. A indicating B may mean that A indicates B indirectly, for example, A indicates C, and B may be obtained through C; A indicating B may also mean that there is an association between A and B.

In the embodiments of the present disclosure, "B corresponding to A" means that B is associated with A, and B may be determined according to A. However, it should also be understood that determining B according to A does not mean determining B only according to A, but also determining B according to A and/or other information.

In the embodiments of the present disclosure, the terms "corresponding" or "correspond" may mean that there is a direct or indirect corresponding relationship between the two, or that there is an association between the two, or that there is a relationship between indicating and being indicated, or configuring and being configured.

In the embodiments of the present disclosure, the "predefined" or "pre-configured" may be implemented by pre-storing corresponding codes, tables or other methods that may be configured to indicate relevant information in a device (for example, including the terminal device and the network device), and the present disclosure does not limit a specific implementation method. For example, the "pre-defined" may indicate being defined in a protocol.

In the embodiments of the present disclosure, the "protocol" may include a standard protocol in the communication field, such as a LTE protocol, a NR protocol, and a related protocol applied to a future communication system, which is not limited.

The term "and/or" in the embodiments of the present disclosure is only an association relationship describing the associated objects, which means that there can be three kinds of relationships; for example, A and/or B can mean three situations including: A exists alone, A and B exist simultaneously, and B exists alone. In addition, the character "/" in the present disclosure generally indicates that associated objects before and after this character are in an "or" relationship.

In the embodiments of the present disclosure, the size of the serial numbers of the above processes does not mean the sequence of performing, and the performing sequence of each process should be determined by its function and internal logic, and should not limit the implementation processes of the embodiments of the present disclosure.

In some embodiments provided herein, it should be understood that the disclosed systems, apparatuses, and methods may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

The units described above as separate components may or may not be physically separated, and the components illustrated as units may or may not be physical units. The units may be located in one place, or may be distributed to multiple network units. Some or all of the units may be selected according to actual needs to achieve the purpose of a solution of the embodiments.

In addition, each functional unit in each embodiment of the present disclosure may be integrated into one processing unit, or each unit may exist physically separately. Optionally, two or more units may also be integrated into one unit.

In the above embodiments, functions may be implemented by a hardware, a software, a firmware or any combination thereof. When implemented by the software, all or a part of the functions may be implemented in the form of a computer program product. The computer program product includes one or more computer instructions. When the computer program instructions are loaded and executed on a computer, flows or functions described in the embodiments of the present disclosure are generated in whole or in part. The computer may be a general purpose computer, a special purpose computer, a computer network, or other programmable apparatus. The computer instructions may be stored in a computer-readable storage medium, or may be transmitted from one computer-readable storage medium to another computer-readable storage medium. For example, the computer instructions may be transmitted from a website, a computer, a server or a data center to another website site, computer, server or data center through wired (such as a coaxial cable, an optical fiber, or a digital subscriber line (DSL)) or wireless (such as infrared, wireless, or microwave, etc.) method. The computer-readable storage medium may be any available medium that may be read by a computer or a data storage device including a server integrated with one or more available media, a data center, or the like. The available medium may be a magnetic medium (for example, a floppy disk, a hard disk, or a magnetic tape), an optical media (for example, a digital video disc (DVD)), or a semiconductor medium (for example, a solid state disk (SSD)), etc.

The above description is only some embodiments of the present disclosure, but the protection scope of the present disclosure is not limited to this. Changes or replacements that are easily thought of by those skilled in the art should be covered in the protection scope of the present disclosure. Therefore, the protection scope of the present disclosure shall be subject to the protection scope of the claims.

What is claimed is:

1. A communication method, comprising:

transmitting, by a terminal device, a first message to a network device; wherein the first message is configured to request downloading at least one type of model data;

wherein the first message comprises at least one of a model identifier corresponding to the at least one type of model data or a service identifier corresponding to the at least one type of model data;

wherein the method further comprises:

generating, by the terminal device, the first message according to first configuration information stored in a non-access stratum (NAS) and/or an assess stratum (AS);

wherein the first configuration information comprises a model identifier corresponding to at least one type of model data for the terminal device, when the first message carries the model identifier corresponding to the at least one type of model data;

the first configuration information comprises a service identifier corresponding to the at least one type of model data for the terminal device, when the first message carries the service identifier corresponding to the at least one type of model data.

2. The method as claimed in claim 1, before the transmitting, by a terminal device, a first message to a network device, further comprising:

transmitting, by the terminal device, a second message to the network device; wherein the second message is configured to register model data expected by the terminal device with the network device.

3. The method as claimed in claim 2, wherein the model data expected by the terminal device comprises the at least one type of model data;

the transmitting, by a terminal device, a first message to a network device, comprise:

transmitting, by the terminal device, the first message to the network device, in response to the at least one type of model data being successfully registered.

4. The method as claimed in claim 2, wherein the second message comprises at least one of:

a model identifier corresponding to the at least one type of model data;

a service identifier corresponding to the at least one type of model data;

indication information, configured to indicate the terminal device perform model data registering with the network device;

first constraint information, configured to indicate a download area expected by the terminal device when the terminal device downloads corresponding model data; or second constraint information, configured to constrain a download time expected by the terminal device when the terminal device downloads corresponding model data.

5. The method as claimed in claim 4, wherein the first constraint information comprises at least one of:

a tracking area (TA) identifier corresponding to the download area expected by the terminal device;

a radio access network area code (RANAC) identifier corresponding to the download area expected by the terminal device;

a cell identifier corresponding to the download area expected by the terminal device; or a geographic coordinate range corresponding to the download area expected by the terminal device.

6. The method as claimed in claim 2, further comprising:

receiving, by the terminal device, a response message of the second message transmitted by the network device; wherein the response message is configured to indicate whether the model data expected by the terminal device is successfully registered.

7. The method as claimed in claim 6, wherein the response message comprises at least one of:

a model identifier corresponding to at least one type of successfully-registered model data in the model data expected by the terminal device;

download area restriction information corresponding to the at least one type of successfully-registered model data; wherein the download area restriction information is configured to restrict an area at which the terminal device is located when the terminal device downloads model data;

download time restriction information corresponding to the at least one type of successfully-registered model data; wherein the download time restriction information is configured to restrict a time when the terminal device downloads model data;

a model identifier corresponding to at least one type of unsuccessfully-registered model data in the model data expected by the terminal device;

registration area restriction information corresponding to the at least one type of unsuccessfully-registered model data; wherein the registration area restriction information is configured to restrict an area at which the terminal device is located when the terminal device registers corresponding model data;

registration time restriction information corresponding to the at least one type of unsuccessfully-registered model data; wherein the registration time area restriction information is configured to restrict a time when the terminal device registers corresponding model data; a failure reason corresponding to the at least one type of unsuccessfully-registered model data; or model data usage restriction information, configured to indicate whether at least two types of successfully-registered model data are capable of being used simultaneously.

8. The method as claimed in claim 2, wherein the second message comprises a model identifier corresponding to to-be-registered model data expected by the terminal device, and/or a service identifier corresponding to the to-be-registered model data expected by the terminal device.

9. The method as claimed in claim 8, further comprising:

generating, by the terminal device, the second message according to second configuration information stored in the non-assess stratum (NAS) and/or the assess stratum (AS); wherein the second configuration information comprises a model identifier corresponding to at least one type of model data for the terminal device, and/or the second configuration information comprises a service identifier corresponding to the at least one type of model data for the terminal device.

10. A communication method, comprising:

receiving, by a network device, a first message transmitted by a terminal device; wherein the first message is configured to request downloading at least one type of model data;

wherein the first message comprises at least one of a model identifier corresponding to the at least one type of model data or a service identifier corresponding to the at least one type of model data, and the first message is generated by the terminal device according to first configuration information stored in a non-access stratum (NAS) and/or an assess stratum (AS); wherein the first configuration information comprises a model identifier corresponding to at least one type of model data for the terminal device, when the first message carries the model identifier corresponding to the at least one type of model data;

the first configuration information comprises a service identifier corresponding to the at least one type of model data for the terminal device, when the first message carries the service identifier corresponding to the at least one type of model data.

11. The method as claimed in claim 10, before the receiving, by a network device, a first message transmitted by a terminal device, further comprising:

receiving, by the network device, a second message transmitted by the terminal device; wherein the second message is configured to register model data expected by the terminal device with the network device.

12. The method as claimed in claim 11, wherein the model data expected by the terminal device comprises the at least one type of model data;

the receiving, by a network device, a first message transmitted by a terminal device, comprises:

receiving, by the network device, the first message transmitted by the terminal device, in response to the at least one type of model data being successfully registered.

13. The method as claimed in claim 11, wherein the second message comprises at least one of:

a model identifier corresponding to the at least one type of model data;

a service identifier corresponding to the at least one type of model data;

indication information, configured to indicate the terminal device perform model data registering with the network device;

first constraint information, configured to indicate a download area expected by the terminal device when the terminal device downloads corresponding model data; or second constraint information, configured to constrain a download time expected by the terminal device when the terminal device downloads corresponding model data.

14. The method as claimed in claim 13, wherein the first constraint information comprises at least one of:

a tracking area (TA) identifier corresponding to the download area expected by the terminal device;

a radio access network area code (RANAC) identifier corresponding to the download area expected by the terminal device;

a cell identifier corresponding to the download area expected by the terminal device; or a geographic coordinate range corresponding to the download area expected by the terminal device.

15. The method as claimed in claim 11, further comprising:

transmitting, by the network device, a response message of the second message to the terminal device; wherein the response message is configured to indicate whether the model data expected by the terminal device is successfully registered.

16. The method as claimed in claim 15, wherein the response message comprises at least one of:

a model identifier corresponding to at least one type of successfully-registered model data in the model data expected by the terminal device;

download area restriction information corresponding to the at least one type of successfully-registered model data; wherein the download area restriction information is configured to restrict an area at which the terminal device is located when the terminal device downloads model data;

download time restriction information corresponding to the at least one type of successfully-registered model data; wherein the download time restriction information is configured to restrict a time when the terminal device downloads model data;

a model identifier corresponding to at least one type of unsuccessfully-registered model data in the model data expected by the terminal device;

registration area restriction information corresponding to the at least one type of unsuccessfully-registered model data; wherein the registration area restriction information is configured to restrict an area at which the terminal device is located when the terminal device registers corresponding model data;

registration time restriction information corresponding to the at least one type of unsuccessfully-registered model data; wherein the registration time area restriction information is configured to restrict a time when the terminal device registers corresponding model data;

a failure reason corresponding to the at least one type of unsuccessfully-registered model data; or model data usage restriction information, configured to indicate whether at least two types of successfully-registered model data are capable of being used simultaneously.

17. A terminal device, comprising a memory and a processor; wherein the memory is configured to store a program, the processor is configured to call the program stored in the memory to perform:

transmitting a first message to a network device; wherein the first message is configured to request downloading at least one type of model data;

wherein the first message comprises at least one of a model identifier corresponding to the at least one type of model data or a service identifier corresponding to the at least one type of model data;

wherein the processor is configured to call the program stored in the memory to further perform:

generating the first message according to first configuration information stored in a non-access stratum (NAS) and/or an assess stratum (AS);

wherein the first configuration information comprises a model identifier corresponding to at least one type of model data for the terminal device, when the first message carries the model identifier corresponding to the at least one type of model data;

the first configuration information comprises a service identifier corresponding to the at least one type of model data for the terminal device, when the first message carries the service identifier corresponding to the at least one type of model data.

18. The terminal device as claimed as claim 17, wherein the processor is configured to call the program stored in the memory to further perform:

transmitting a second message to the network device; wherein the second message is configured to register model data expected by the terminal device with the network device.

19. The terminal device as claimed as claim 17, wherein the processor is configured to call the program stored in the memory to further perform:

establishing a session management context; wherein the session management context is configured to manage a download process, a modification process, or a deletion process of the at least one type of model data.

20. The terminal device as claimed as claim 17, wherein the processor is configured to call the program stored in the memory to further perform:

receiving a download configuration transmitted by the network device; wherein the download configuration is configured to configure the terminal device to download the at least one type of model data.

* * * * *